United States Patent
Kim

[11] Patent Number: 6,033,011
[45] Date of Patent: Mar. 7, 2000

[54] IMPACT BEAM STRUCTURE FOR AUTOMOBILE SIDE DOORS

[75] Inventor: Chang-Dong Kim, Kyunggi-do, Rep. of Korea

[73] Assignee: Hyundai Motor Company, Seoul, Rep. of Korea

[21] Appl. No.: 08/991,892

[22] Filed: Dec. 16, 1997

[30] Foreign Application Priority Data

Dec. 16, 1996 [KR] Rep. of Korea ............... 96-66438

[51] Int. Cl.[7] ................................................ B60J 5/00
[52] U.S. Cl. ........................ 296/189; 296/146.6; 49/52
[58] Field of Search ............................... 296/188, 189, 296/146.1, 146.6, 146.5; 49/501, 502, 503; 186/371, 374, 375, 376; 280/752

[56] References Cited

U.S. PATENT DOCUMENTS

| | | | |
|---|---|---|---|
| 4,411,466 | 10/1983 | Koike | 296/188 |
| 4,969,680 | 11/1990 | Shimoda | 296/188 X |
| 5,169,204 | 12/1992 | Kelman | 296/189 X |
| 5,822,927 | 10/1998 | Hellenkamp et al. | 49/502 |

*Primary Examiner*—D. Glenn Dayoan
*Assistant Examiner*—Jason Morrow
*Attorney, Agent, or Firm*—Christie, Parker & Hale, LLP

[57] ABSTRACT

An impact beam structure for automobile side doors is disclosed. In the impact beam structure, a protector panel is mounted to the impact beam by a plurality of guide rods, which are welded to the protector panel and pass through the guide holes of the impact beam prior to being tightened by nuts. The guide rods individually have both a stopper at the welded junction and an uneven part at a section between the impact beam and the stopper. The uneven part normally spaces the protector panel apart from the impact beam and is selectively thrust into the guide hole in the event of a side collision, thus allowing the protector panel to primarily absorb impact energy. The stopper selectively comes into contact with the impact beam, thus stopping the impact energy absorbing operation of the protector panel and allowing the impact beam to secondarily absorb the impact energy.

8 Claims, 3 Drawing Sheets

IMPACT BEAM STRUCTURE FOR AUTOMOBILE SIDE DOORS

BACKGROUND OF THE INVENTION

1. Field of the Invention

The present invention relates, in general, to an impact beam structure for automobile side doors and, more particularly, to an impact beam structure capable of almost completely absorbing impact in the event of a side collision, thus effectively preventing a side door from being badly deformed or thrust into the passenger compartment, and protecting passengers from serious injury, and improving the safety of automobiles.

2. Description of the Prior Art

As well known to those skilled in the art, in order to protect passengers in the passenger compartment of an automobile from side collision impact, an impact beam, which is a high strength steel hollow pipe, is installed in each side door as shown in FIG. 4. As shown in the drawing, an impact beam 2 is mounted to a predetermined portion of the inner panel 4 of a side door 1, with each end of the impact beam 2 being fixed to the inner panel 4 using a bracket 3. In such a case, the impact beam 2, bracket 3 and inner panel 4 are typically integrated into a single structure through a welding process. The impact beam 2 is also positioned inside an outer panel 5, with a plurality of regularly-spaced cushions 6 being interposed at the junction between the impact beam 2 and the outer panel 5. The cushions 6 thus space the impact beam 2 apart from the outer panel 5 at a gap, thus absorbing impact in the event of a side collision.

In the event of a side collision, the high strength steel impact beam 2 somewhat effectively resists being deformed. However, the two brackets 3 may fail to resist the side collision impact and may be deformed, or broken. In addition, the welded junctions between the impact beam 2, bracket 3 and inner panel 4 may fail to resist the collision impact, thus being excessively deformed or broken. Therefore, the typical impact beam structure for side doors cannot effectively prevent a side door from being badly deformed or thrust into the passenger compartment or effectively protect passengers from serious injury, thus failing to improve the safety of automobiles.

SUMMARY OF THE INVENTION

Accordingly, the present invention has been made keeping in mind the above problems occurring in the prior art, and an objective of the present invention is to provide an impact beam structure for automobile side doors, which is more than twice as effective as prior art structure and almost completely absorbs impact in the event of a side collision, thus preventing the side door from being badly deformed or thrust into the passenger compartment and protecting passengers from serious injury, and improving the safety of automobiles.

In order to accomplish the above objective, the present invention provides an impact beam structure for an automobile side door, with: an impact beam having a plurality of guide holes and mounted to an inner panel of the side door, with each end of the impact beam being fixed to the inner panel using a plurality of brackets. A protector panel is interposed between the impact beam and an outer panel of the side door with a plurality of cushions being interposed between the protector panel and the outer panel. Additionally, a plurality of guide rods are fixed to the protector panel and respectively pass through the guide holes of the impact beam prior to being tightened by nuts at the outside of the impact beam, thus normally holding a position of the protector panel spaced apart from the impact beam and selectively allowing the protector panel to be thrust toward the impact beam while primarily absorbing impact energy in the event of a side collision.

In the preferred embodiment of this invention, each of the guide rods includes a stopper provided at the junction between the protector panel and the guide rod and selectively coming into contact with the impact beam in the event of such a side collision, thus stopping the impact energy absorbing operation of the protector panel prior to allowing the impact beam to secondarily absorb the impact energy. An uneven part is formed at a section between the impact beam and the stopper and having an outer diameter larger than the diameter of each of the guide holes, the uneven part normally spacing the protector panel apart from the impact beam and being selectively broken at its uneven outside surface and being thrust into the guide hole in the event of such a side collision, thus allowing the protector panel to be thrust toward the impact beam while primarily absorbing impact energy. Additionally, a bolt part is formed at the end of the guide rods and is tightened by each of the nuts.

BRIEF DESCRIPTION OF THE DRAWINGS

The above and other objectives, features and other advantages of the present invention will be more clearly understood from the following detailed description taken in conjunction with the accompanying drawings, in which.

DESCRIPTION OF THE PREFERRED EMBODIMENTS

Figure 1:
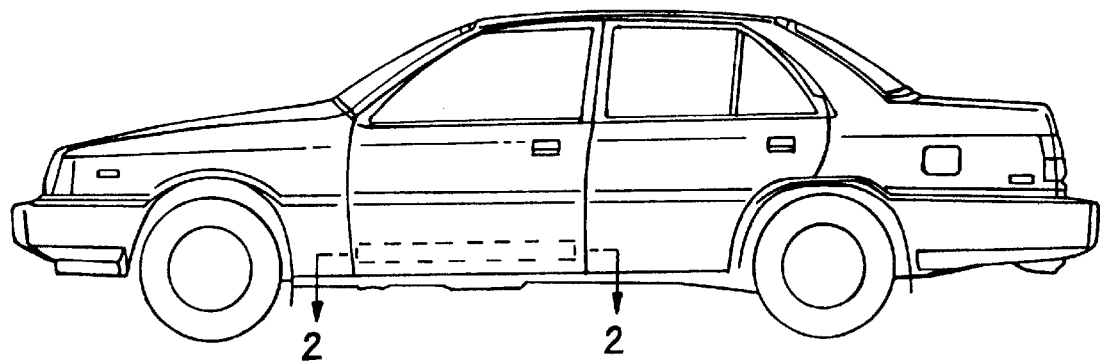
FIG. 1 is a side view of an automobile with an impact beam structure of this invention.
Figure 2:
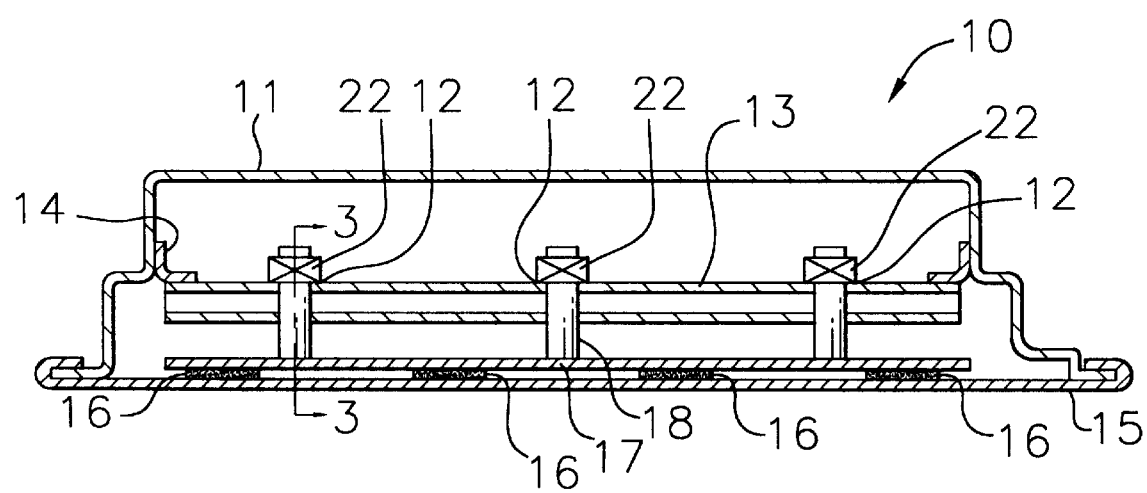
FIG. 2 is a sectional view of the impact beam structure of this invention taken along the line 2—2 of FIG. 1.
Figure 3:
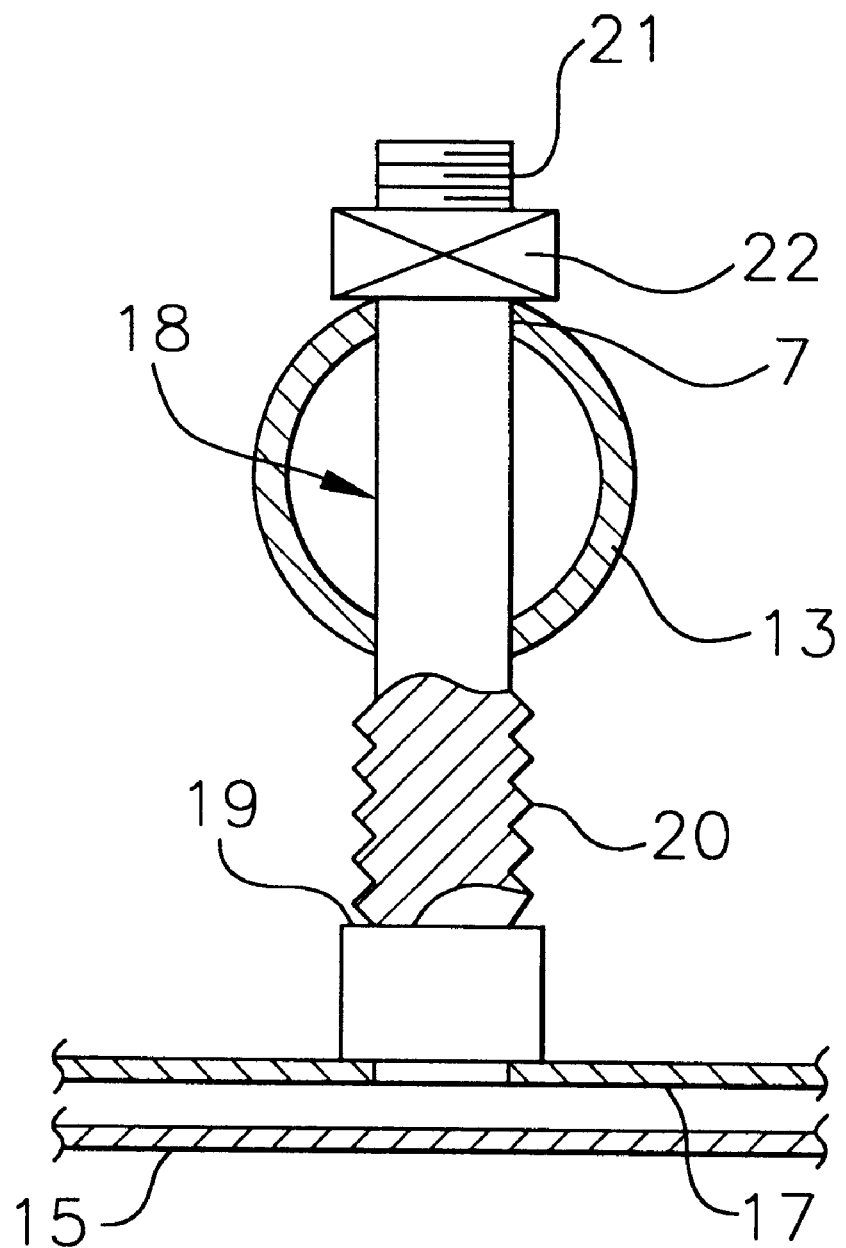
FIG. 3 is a sectional view of the impact beam structure of this invention taken along the line 3—3 of FIG. 2.
Figure 4:
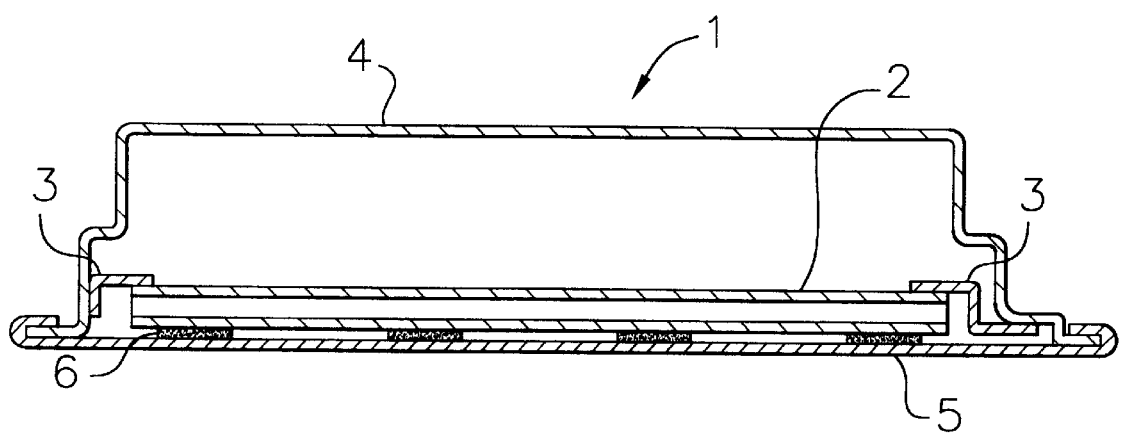
FIG. 4 is a view corresponding to FIG. 2, but showing a typical impact beam structure.

FIG. 1 is a side view of an automobile with an impact beam structure of this invention. FIGS. 2 and 3 are sectional views showing the impact beam structure in accordance with the preferred embodiment of this invention.

As shown in the drawings, the impact beam structure of this invention is comprised of an impact beam 13, which is preferably a high strength steel hollow pipe and is mounted to a predetermined portion of the inner panel 11 of a side door 10, with each end of the impact beam 13 being fixed to the inner panel 11 using a plurality of brackets 14. In such a case, the impact beam 13, brackets 14 and inner panel 11 may be integrated into a single structure through a welding process. The impact beam 13 is diametrically holed at several positions, thus having a plurality of guide holes 12. The impact beam 13 is also positioned inside an outer panel 15, with a protector panel 17 being interposed between the impact beam 13 and the outer panel 15. In such a case, the protector panel 17 is spaced apart from both the impact beam 13 and the outer panel 15. The protector panel 17 is designed to absorb impact in the event of a side collision as will be described later herein. A plurality of regularly-spaced cushions 16 are interposed at the junction between the protector panel 17 and the outer panel 15, thus spacing the protector panel 17 apart from the outer panel 15 and absorbing the collision impact. The protector panel 17 is mounted to the impact beam 13 using a plurality of soft steel guide rods 18, which are perpendicularly fixed to the protector panel 17 through a welding process and respectively pass through the guide holes 12 of the impact beam 13. Each of the guide rods 18 has a stopper 19 at the junction between the protector panel 17 and each guide rod 18 and is externally uneven at a section between the impact beam 13 and the stopper 19, thus forming a section having a rough, or uneven, outer surface part 20 having an outer diameter larger than the diameter of each guide hole 12. The end of each guide rod 18, which projects from the guide hole 12 of the impact beam 13, is externally threaded, thus forming a bolt part 21 tightened by a nut 22. In the event of a side collision, the uneven part 20 prevents the impact beam 13 from being thrust into the passenger compartment, while the stopper 19 limits the movement of the protector panel 17. The operational effect of both the stopper 19 and the uneven part 20 will be described in detail hereinbelow.

That is, the protector panel 17 is mounted to the impact beam 13 by inserting a plurality of guide rods 18 into the guide holes 12 of the impact beam 13 until the uneven part 20 of each rod 18 comes into contact with the impact beam 13 and stops the rod 18. Therefore, the protector panel 17 is spaced apart from the impact beam 13 by a distance, which is equal to the total length of the stopper 19 and uneven part 20. In such a case, the regularly-spaced cushions 16 are interposed at the junction between the protector panel 17 and the outer panel 15, thus spacing the protector panel 17 apart from the outer panel 15. Thereafter, the bolt part 21 of each guide rod 18 is tightened by the nut 22 at the outside of the impact beam 13, thus supporting the normal position of the protector panel 17 relative to the impact beam 13 as shown in FIGS. 2 and 3.

When slight impact is applied to the side door of an automobile, such a slight impact energy is effectively absorbed by the cushions 16. Meanwhile, when strong impact is applied to the side door, the cushions 16 fail to effectively absorb the strong impact energy, thus allowing the protector panel 17 to be thrust toward the impact beam 13. In such a case, the uneven surface of the guide rod's uneven part 20 is forcibly cut by the edge of the guide hole 12, thus allowing the guide rod 18 to move through the guide hole 12 of the impact beam 13. The uneven part 20 of each guide rod 18 in the above state primarily absorbs the impact energy. Such a movement of the guide rod 18 is stopped by the stopper 19, which comes into contact with the impact beam 13. Therefore, the protector panel 17 is prevented from being further thrust and the remaining impact energy is completely absorbed by the impact beam 13. That is, the impact beam 13 secondarily and effectively absorbs the remaining impact energy.

As described above, the present invention provides an improved impact beam structure for automobile side doors. In the impact beam structure, a protector panel is mounted to the impact beam using a plurality of soft steel guide rods. The guide rods, which are welded to the protector panel, respectively pass through the guide holes of the impact beam prior to being tightened by nuts at the outside of the impact beam. Each of the guide rods has a stopper at the junction between the protector panel and the guide rod and is externally uneven at a section between the impact beam and the stopper, thus forming an uneven part having an outer diameter larger than the diameter of each guide hole. When strong impact is applied to the side door, the protector panel, with the guide rods, is thrust toward the impact beam. In such a case, the uneven surface of the guide rod's uneven part is forcibly cut by the edge of the guide hole, thus allowing the guide rod to move through the guide hole while primarily absorbing the impact energy. During such a movement of the guide rod, the stopper comes into contact with the impact beam, thus stopping the movement of the protector panel and allowing the impact beam to secondarily absorb the remaining impact energy.

The impact beam structure of this invention thus doubly and almost completely absorbs impact energy in the event of a side collision, thereby preventing the side door from being badly deformed or thrust into the passenger compartment and protecting passengers from serious injury, and improving the safety of automobiles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An impact beam structure for an automobile side door having an inner side panel and an outer side panel, comprising:

an impact beam having a pair of ends and a plurality of guide holes each having a diameter, the impact beam being mounted to the inner panel of said side door, with each end of said impact beam being fixed to the inner panel using a plurality of brackets;

a protector panel interposed between said impact beam and the outer panel of the side door with a plurality of cushions being interposed between said protector panel and said outer panel; and a plurality of guide rods fixed to said protector panel and each of the plurality of guide rods passing through a respective one of said plurality of guide holes of the impact beam prior to being tightened by a nut at an outside of the impact beam, thus normally holding a position of the protector panel spaced apart from said impact beam and selectively allowing the protector panel to be thrust toward the impact beam while primarily absorbing impact energy in an event of a side collision, each of said plurality of guide rods comprising:

a stopper provided at a junction between the protector panel and the guide rod and selectively coming into contact with the impact beam in the event of such a side collision, thus stopping an impact energy absorbing operation of the protector panel prior to allowing the impact beam to secondarily absorb the impact energy;

a section having a rough outer surface, the section formed between the impact beam and said stopper and having an outer diameter larger than the diameter of each of said plurality of guide holes, said section normally spacing the protector panel apart from the impact beam and being thrust into one of the plurality of guide holes in the event of such a side collision, thus allowing the protector panel to be thrust toward the impact beam while primarily absorbing impact energy; and a bolt part formed at the end of said guide rod for receiving a nut.

2. An impact beam structure for an automobile side door having an inner side panel and an outer side panel, the impact beam structure comprising:

an impact beam coupled to the inner side panel and having a guide hole through the impact beam;

a protector panel between the impact beam and the outer panel; and a guide rod fixedly coupled to the protector panel at one end, and passing through the guide hole in the impact beam such that the protector panel is spaced apart from the impact beam.

3. The impact beam structure according to claim 2 further comprising at least one cushion between the protector panel and the outer panel.

4. The impact beam structure according to claim 2 wherein the guide rod is designed to absorb initial impact energy resulting from a collision involving the automobile side door, the guide rod comprising a stopper at the end of the guide rod coupled to the protector panel, the stopper having an outer surface extending beyond an outer edge of the guide hole to limit movement of the protector panel.

5. The impact beam structure according to claim 4 wherein the guide rod further comprises a section between the stopper and the impact beam having a rough outer surface extending beyond the outer edge of the guide hole, and wherein the rough outer section of the guide rod absorbs the initial impact energy resulting from a collision involving the automobile side door as it is forced through the guide hole.

6. The impact beam structure according to claim 5 wherein the guide rod further comprises an externally threaded end opposite the protector panel for receiving a nut.

7. The impact beam structure according to claim 2 wherein the impact beam comprises a plurality of guide holes, and the guide rod comprises a plurality of guide rods, each of the plurality of guide rods extending through one of the plurality of guide holes.

8. The impact beam structure according to claim 2 further comprising a plurality of brackets for coupling the impact beam to the inner panel.

* * * * *